United States Patent
Pullara, Jr.

(10) Patent No.: US 8,191,804 B1
(45) Date of Patent: Jun. 5, 2012

(54) FERTILIZER DISPENSER

(76) Inventor: Sam Pullara, Jr., Tampa, FL (US)

( * ) Notice: Subject to any disclaimer, the term of this patent is extended or adjusted under 35 U.S.C. 154(b) by 1378 days.

(21) Appl. No.: 11/192,745

(22) Filed: Jul. 29, 2005

Related U.S. Application Data

(60) Provisional application No. 60/661,869, filed on Mar. 15, 2005.

(51) Int. Cl.
*A01C 17/00* (2006.01)

(52) U.S. Cl. ........ 239/686; 239/681; 239/683; 239/689; 239/650; 222/317; 222/473

(58) Field of Classification Search .................. 239/650, 239/663, 668, 679, 676, 680, 681, 689, 682, 239/686, 683; 222/473, 317
See application file for complete search history.

(56) References Cited

U.S. PATENT DOCUMENTS

| | | | | |
|---|---|---|---|---|
| 2,243,996 A | * | 6/1941 | Baughman | 239/687 |
| 3,227,461 A | * | 1/1966 | Love, Jr. | 239/686 |
| 3,966,124 A | * | 6/1976 | Sukup | 239/666 |
| 3,993,225 A | * | 11/1976 | Manni | 222/324 |
| 4,071,170 A | * | 1/1978 | Gunzel et al. | 406/98 |
| 5,054,693 A | * | 10/1991 | Chow | 239/681 |
| 5,123,598 A | * | 6/1992 | Courtney et al. | 239/686 |

* cited by examiner

*Primary Examiner* — Dinh Q Nguyen
(74) *Attorney, Agent, or Firm* — Kenneth L. Tolar

(57) ABSTRACT

A motorized fertilizer dispenser includes a frustoconical housing having an open upper end in communication with a hollow interior. At a lower end is a dispersal opening. A rotatable sifting blade is positioned within the housing interior and adjacent the dispersal opening. A rotary disc having a plurality of radial blades positioned thereon is situated immediately beneath the dispersal opening. A motor operates both the sifting blade and dispersal disc whereby a desired amount of fertilizer is dropped onto the disc and projected outwardly to a target area.

3 Claims, 2 Drawing Sheets

US 8,191,804 B1

FERTILIZER DISPENSER

CROSS REFERENCE TO RELATED APPLICATIONS

This application is entitled to the benefit of provisional application No. 60/661,869 filed on Mar. 15, 2005.

BACKGROUND OF THE INVENTION

The present invention relates to an automated fertilizer dispenser.

DESCRIPTION OF THE PRIOR ART

Uniformly dispersing fertilizer to a lawn or garden has always been problematic. Manually dispersing fertilizer often results in uneven distribution and an excess in certain areas, which can actually damage vegetation. Though many dispensers having rotatable dispersing blades exist in the prior art, they are manually operable and therefore cumbersome and laborious. The present invention provides a motorized fertilizer distributor that automatically and uniformly distributes fertilizer to a target area.

SUMMARY OF THE INVENTION

The present invention relates to a fertilizer distributor. The device comprises a hollow, frustoconical housing having an open upper end in communication with a hollow interior and a lower end. At the upper end is a pivotal handle which can be grasped by a user to hold or transport the device. At a lower end is a dispersal opening. Received within the housing interior immediately above the dispersal opening is a rotary sifting blade. Immediately beneath the lower end of the housing is a compartment with a rotatable disc received therein. The disc includes a plurality of radially extending dispersal blades on the upper surface thereof. Both the sifting blade and disc are rotated by a motor that is mounted beneath the disc compartment. A sliding lever on the compartment exterior varies the size of the dispersal opening to control the amount of fertilizer that flows to the disc. A handle is affixed to the housing exterior which includes a trigger that varies the motor speed to vary the rate and distance that the fertilizer is projected from the disc. Preferably, the motor is powered with a rechargeable battery.

To use the above described device, the housing interior is loaded with fertilizer, the dispersal opening is adjusted to a desired size and the motor is activated and set to a desired speed. Accordingly, the sifting blade will begin rotating to pulverize the fertilizer and force it through the dispersal opening onto the disc. The disc blades then project the fertilizer outwardly from the housing and onto a lawn or garden.

It is therefore an object of the present invention to provide a fertilizer dispenser that uniformly distributes fertilizer to a desired area.

It is another object of the present invention to provide a fertilizer dispenser that automatically distributes fertilizer.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
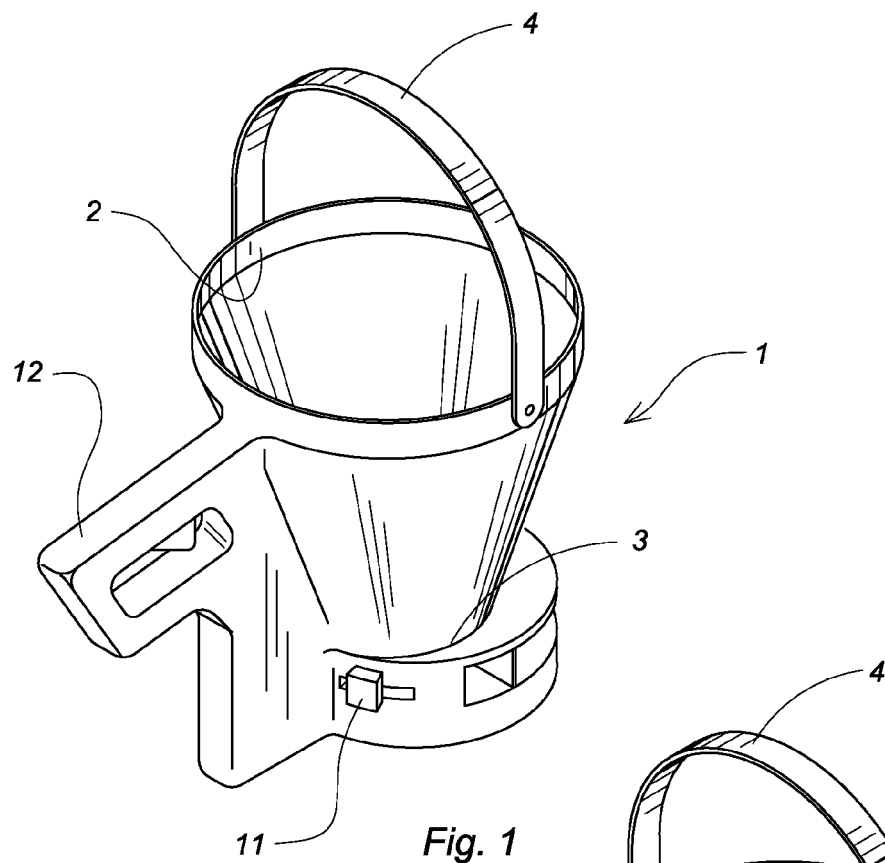
FIG. 1 is a perspective view of the fertilizer dispenser according to the present invention.
Figure 2:
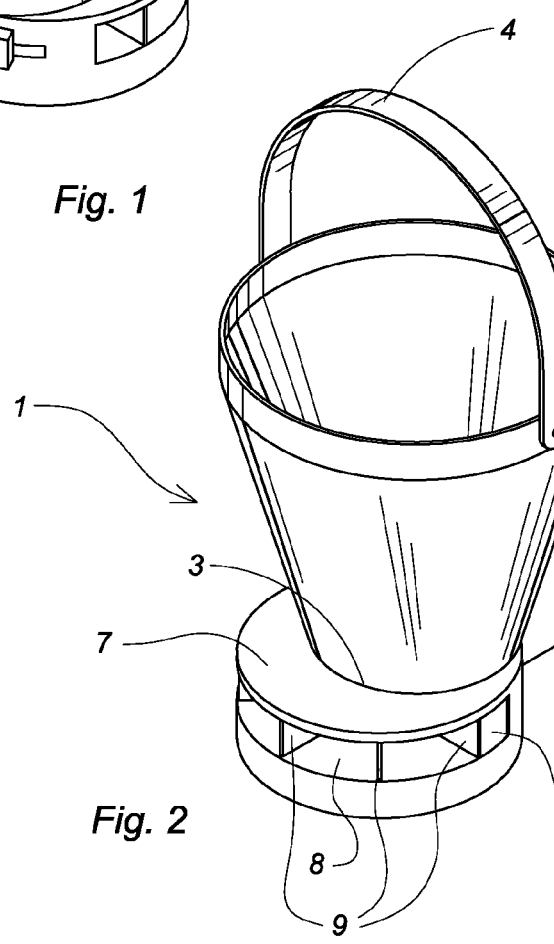
FIG. 2 is a perspective view of the fertilizer dispenser from a side opposite of that depicted in FIG. 1.
Figure 3:
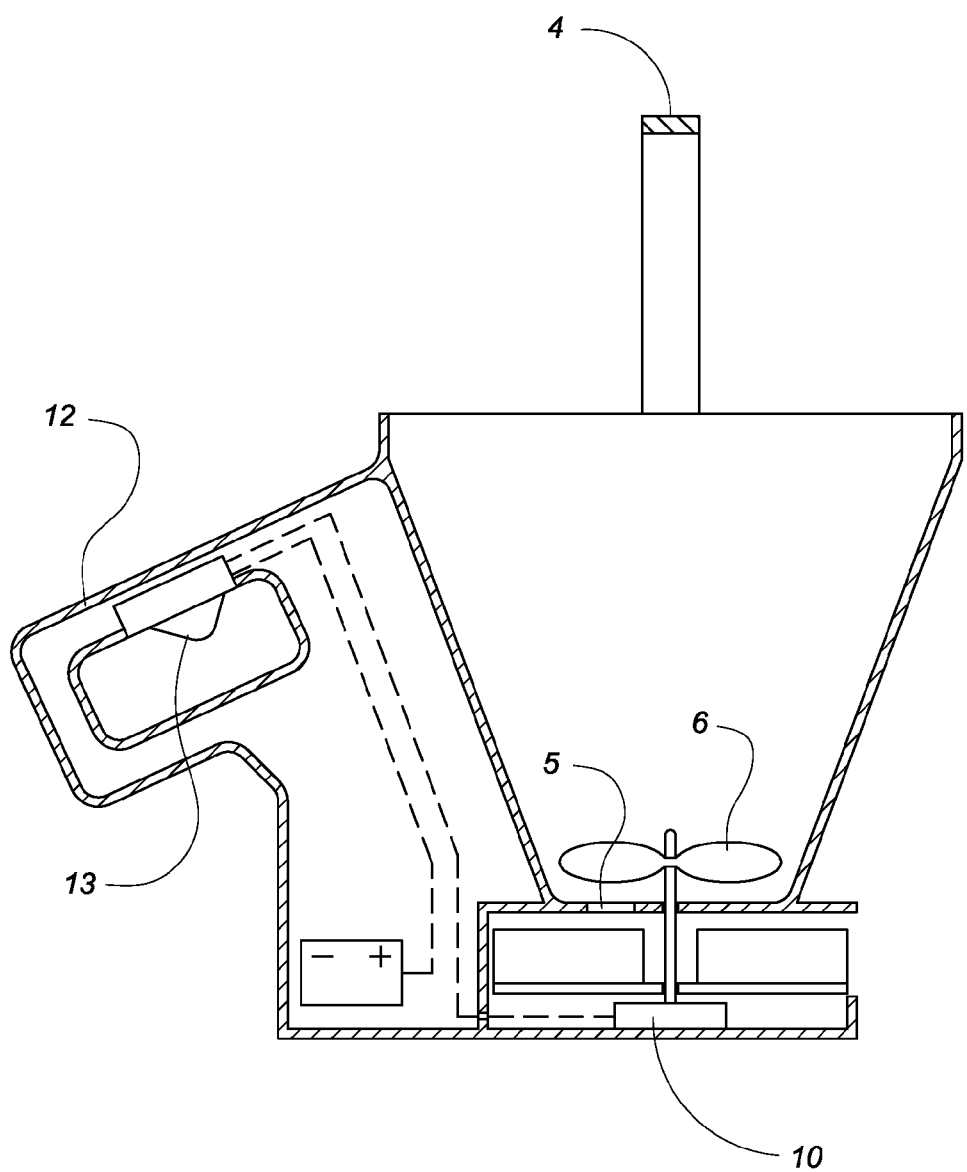
FIG. 3 is a plan, cross-sectional view of the fertilizer dispenser according to the present invention.

The present invention relates to a fertilizer distributor. The device comprises a hollow, frustoconical housing 1 having an open upper end 2 in communication with a hollow interior and a lower end 3. At the upper end is a pivotal handle 4 which can be grasped by a user to hold or transport the device. At a lower end is a dispersal opening 5.

Received within the housing interior immediately above the dispersal opening is a rotary sifting blade 6. Immediately beneath the lower end of the housing is an annular compartment 7 with a rotatable disc 8 received therein. The compartment includes a semi-circumferential dispensing opening 31 in communication with the interior. The disc includes a plurality of radially extending dispersal blades 9 on the upper surface thereof. Both the sifting blade and disc are rotated by a motor 10 that is mounted beneath the disc compartment. A sliding lever 11 on the compartment exterior varies the size of the dispersal opening to control the amount of fertilizer that flows to the disc. A trigger handle 12 is affixed to the housing exterior which includes a trigger 13 that varies the motor speed to vary the rate and distance that the fertilizer is projected from the disc. Preferably, the motor is powered with a rechargeable battery.

To dispense fertilizer, a user loads the housing interior with fertilizer and adjusts the dispersal opening to a desired size. The motor is activated and set to a desired speed. Accordingly, the sifting blade will begin rotating to pulverize the fertilizer and force it through the dispersal opening and onto the disc. The disc blades then project the fertilizer outwardly through the compartment dispensing opening and onto a lawn or garden.

The above described device is not limited to the exact details of construction and enumeration of parts provided herein. For example, though the device is described as being a fertilizer dispenser, it can also be used to distribute birdseed, grass seeds, insecticides, or any other granular material. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fertilizer distributor comprising:
  a hollow frustoconical housing having an open upper end defined by a continuous rim, said open upper end in communication with a hollow interior, said housing also having a lower end with a dispersal opening thereon;
  a rotary sifting blade received within the hollow interior immediately above the dispersal opening, said disc including a plurality of radially-extending dispersal blades on an upper surface thereof;
  a compartment immediately beneath the dispersal opening, said compartment having an interior chamber with a rotatable disc received therein, said compartment further having a semi-circumferential dispensing opening in communication with said interior chamber;

a motor mounted beneath said compartment for automatically rotating said sifting blade and said disc whereby fertilizer within said housing interior is pulverized, forced through said dispersal opening and onto said disc and is projected through said dispensing opening;

a handle having two opposing ends, a first of said ends pivotally attached to a first portion of said rim, a second of said ends pivotally attached to a second, opposing portion of said rim, said handle grasped by a user to hold and transport the housing.

2. The fertilizer distributor according to claim 1 further comprising a sliding lever on an exterior surface of said compartment that varies a size of said dispersal opening.

3. The fertilizer distributor according to claim 1 further comprising a trigger handle affixed to said housing, said trigger handle having a trigger that varies a speed of said motor to vary a rate and distance that the fertilizer is projected from the disc.

* * * * *